US011860701B2

(12) United States Patent
Motoi et al.

(10) Patent No.: US 11,860,701 B2
(45) Date of Patent: Jan. 2, 2024

(54) ELECTRONIC DEVICE AND POWER SUPPLY METHOD FOR ELECTRONIC DEVICE

(71) Applicant: Sharp NEC Display Solutions, Ltd., Tokyo (JP)

(72) Inventors: Hideki Motoi, Tokyo (JP); Tomohisa Ukegawa, Tokyo (JP); Isamu Kenmochi, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 17/625,297

(22) PCT Filed: Jul. 12, 2019

(86) PCT No.: PCT/JP2019/027657
§ 371 (c)(1),
(2) Date: Jan. 6, 2022

(87) PCT Pub. No.: WO2021/009794
PCT Pub. Date: Jan. 21, 2021

(65) Prior Publication Data
US 2022/0261056 A1     Aug. 18, 2022

(51) Int. Cl.
*G06F 1/26* (2006.01)
*G06F 1/3215* (2019.01)

(52) U.S. Cl.
CPC ............ *G06F 1/266* (2013.01); *G06F 1/3215* (2013.01)

(58) Field of Classification Search
CPC ...... G06F 1/266; G06F 1/3215; G06F 1/1632; G09G 2370/042; G09G 2370/10; G09G 5/12

USPC ......................................................... 713/300
See application file for complete search history.

(56) References Cited

U.S. PATENT DOCUMENTS

| 10,895,892 | B1* | 1/2021 | Yang ........................ G06F 1/266 |
| 2004/0230846 | A1* | 11/2004 | Mancey .................. H04L 12/10 |
| | | | 713/300 |
| 2009/0228723 | A1 | 9/2009 | Yoshizaki |
| 2009/0284071 | A1 | 11/2009 | Mitsuoka et al. |
| 2012/0242700 | A1 | 9/2012 | Osuga et al. |

(Continued)

FOREIGN PATENT DOCUMENTS

| EP | 1 659 478 A1 | 5/2006 |
| JP | 2009-218752 A | 9/2009 |

(Continued)

OTHER PUBLICATIONS

International Search Report (ISR) (PCT Form PCT/ISA/210), in PCT/JP2019/027657, dated Jan. 10, 2019.

(Continued)

*Primary Examiner* — Chun Cao
(74) *Attorney, Agent, or Firm* — MCGINN I.P. LAW GROUP, PLLC

(57) ABSTRACT

An electronic device includes: a plurality of connection ports to which external devices are able to be connected; and a controller configured to control whether or not to supply power to an external device connected to a connection port in preference to an external device connected to another connection port on the basis of a priority level assigned to each of the plurality of connection ports.

11 Claims, 5 Drawing Sheets

(56) References Cited

U.S. PATENT DOCUMENTS

| | | | | |
|---|---|---|---|---|
| 2014/0379951 A1* | 12/2014 | Taki | .................... | G06F 13/4068 |
| | | | | 710/303 |
| 2015/0006872 A1* | 1/2015 | Sonobe | .................... | G06F 3/14 |
| | | | | 713/2 |
| 2016/0124463 A1* | 5/2016 | Ellis | .................... | G06F 1/1632 |
| | | | | 710/304 |
| 2017/0046289 A1* | 2/2017 | Hundal | ................ | G06F 13/385 |
| 2020/0012326 A1* | 1/2020 | Steele | ................ | G01R 21/133 |

FOREIGN PATENT DOCUMENTS

| | | | |
|---|---|---|---|
| JP | 2009-277014 A | | 11/2009 |
| JP | 2012-022234 A | | 2/2012 |
| JP | 2012-203549 A | | 10/2012 |
| JP | 2018-116342 A | | 7/2018 |
| JP | 2018-535493 A | | 11/2018 |
| JP | 2019-012479 | * | 1/2019 |
| JP | 2019-012479 A | | 1/2019 |
| JP | 2019-016319 A | | 1/2019 |
| JP | 2019-087089 A | | 6/2019 |
| WO | WO 2005/022369 A1 | | 3/2005 |

OTHER PUBLICATIONS

Japanese Office Action dated Oct. 17, 2023, in corresponding Japanese Patent Application No. 2022-136738, with an English translation thereof.

* cited by examiner

| PORT IDENTIFICATION INFORMATION | PRIORITY LEVEL |
|---|---|
| p1 | 1 |
| p2 | 2 |
| p3 | 3 |
| ... | ... |

ELECTRONIC DEVICE AND POWER SUPPLY METHOD FOR ELECTRONIC DEVICE

TECHNICAL FIELD

The present invention relates to an electronic device and a power supply method for the electronic device.

BACKGROUND ART

An external device can be charged from an electronic device by connecting the electronic device connected to a commercial power supply to the external device such as a smartphone or a notebook PC via a universal serial bus (USB) type-C cable. Also, when an electronic device and an external device are connected via a USB type-C cable, a process of identifying an external device to which power is supplied in accordance with the order in which external devices have been connected to the electronic device may be performed.

Also, in Patent Literature 1, technology in which an electronic device puts operations of some circuits inside the electronic device in a standby state in accordance with predetermined priority and the electronic device performs the supply of power to an external device in preference to the supply of power to a functional unit inside of the electronic device is disclosed.

CITATION LIST

Patent Literature

[Patent Literature 1]
  Japanese Unexamined Patent Application, First Publication No. 2012-022234

SUMMARY OF INVENTION

Technical Problem

However, power capable of being supplied from an electronic device to an external device is limited. Thus, there is a problem that power may not be supplied to a target external device in accordance with the sequential order in which external devices are connected to the electronic device. In particular, the external device may be a display device and power may not be supplied to the display device in accordance with the sequential order in which the display device is connected to the electronic device. In this case, because nothing is displayed on the display device, there is a problem that it is difficult to perform an input operation using an input device with reference to content displayed on a display screen of the display device or the like.

Solution to Problem

One aspect of the present invention is an electronic device including: a plurality of connection ports to which external devices are able to be connected; and a controller configured to control whether or not to supply power to an external device connected to a connection port in preference to an external device connected to another connection port on the basis of a priority level assigned to each of the plurality of connection ports.

In addition, one aspect of the present invention is an electronic device including: a plurality of connection ports to which external devices are able to be connected; a receiver configured to receive identification information indicating that the external device is a display device from the external devices connected to the connection ports; a determiner configured to determine whether or not the external device connected to the connection port is a display device on the basis of the identification information; and a controller configured to supply power to an external device that is a display device among the external devices connected to the connection ports in preference to an external device that is not a display device on the basis of a determination result.

In addition, one aspect of the present invention is a power supply method for an electric device, the power supply method including: controlling whether or not to supply power to an external device connected to a connection port in preference to an external device connected to another connection port on the basis of a priority level assigned to each of a plurality of connection ports to which external devices are able to be connected.

In addition, one aspect of the present invention is a power supply method for an electronic device, the power supply method including: receiving, by a receiver, identification information indicating that an external device is a display device from external devices connected to a plurality of connection ports to which the external devices are able to be connected; determining, by a determiner, whether or not the external device connected to the connection port is a display device on the basis of the identification information; and supplying, by a controller, power to an external device that is a display device among the external devices connected to the connection ports in preference to an external device that is not a display device on the basis of a determination result.

Advantageous Effects of Invention

An electronic device of the present invention can supply power to a display device regardless of the order of connection.

DESCRIPTION OF EMBODIMENTS

Figure 1:
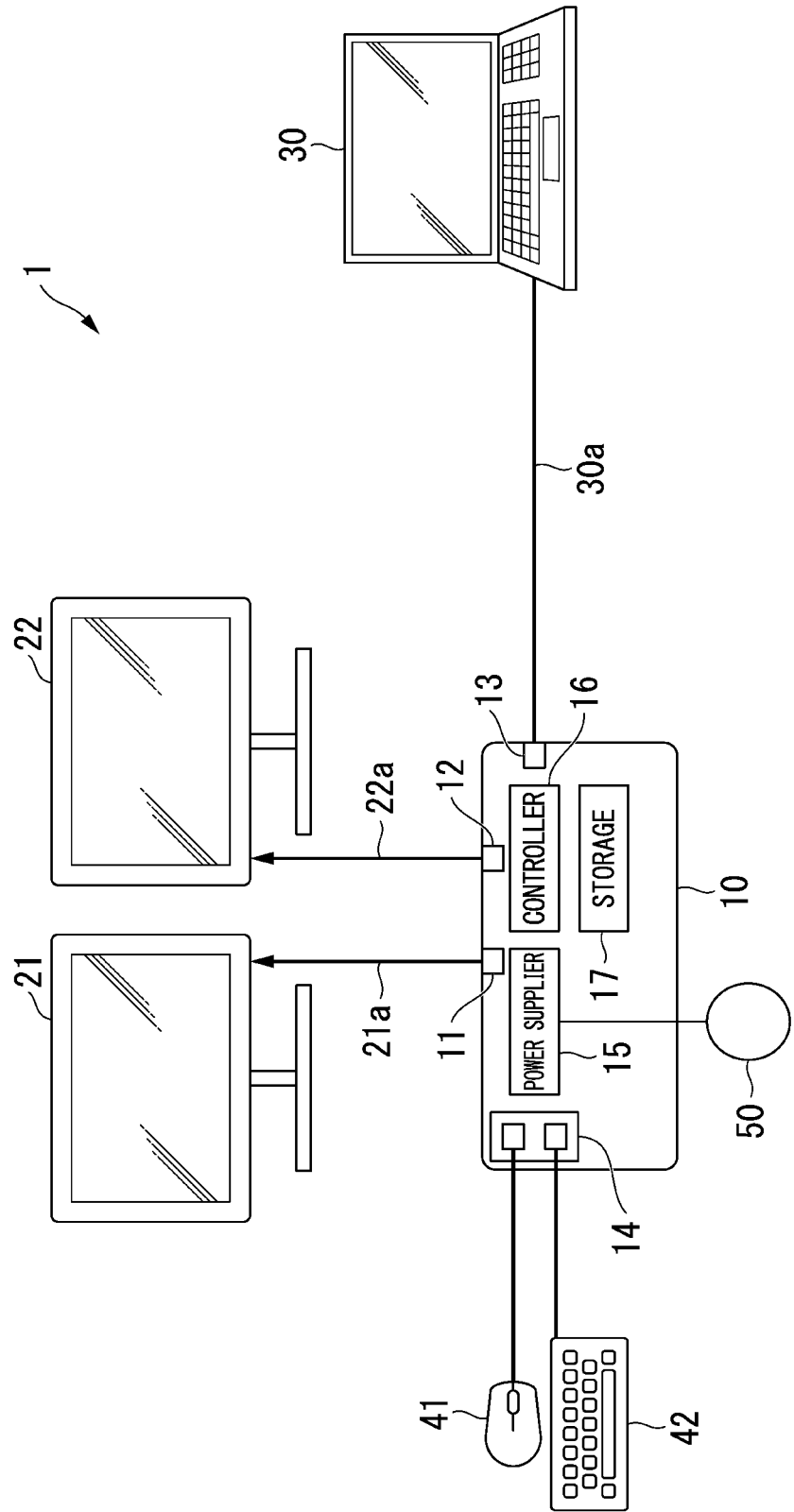
FIG. 1 is a diagram showing a display system 1 using a dock station 10 in a first embodiment.

FIG. 1 is a diagram showing a display system 1 using a dock station 10 in a first embodiment. In the display system 1, a plurality of external devices can be connected to the dock station (docking station) 10 via a cable. In FIG. 1, the case where a display device 21, a display device 22, a computer 30, an input device 41, and an input device 42 are connected to the dock station 10 is shown. The external device capable of being connected to the dock station 10 may be an external device other than the display device, the computer, and the input device. Also, some types of external devices such as the display device, the computer, and the input device may be connected to the dock station 10. The number of external devices of the same type may be arbitrary.

A first USB port 11, a second USB port 12, a third USB port 13, a USB hub 14, a power supplier 15, a controller 16, and a storage 17 are provided in the dock station 10.

When an external device is connected to any one of the first USB port 11, the second USB port 12, and the third USB port 13, an electrical connection via a cable is established. This cable enables communication between the dock station 10 and the external device for a negotiation regarding the supply of power. In accordance with a negotiation result, a cable compatible with a standard in which power can be supplied from the dock station 10 to the external device is used. An example of this cable is a USB Type-C cable.

This dock station 10 is compatible with a USB power delivery (PD) standard and can negotiate with the external device connected via a USB Type-C cable according to the USB PD standard. If the external device connected to any one of the first USB port 11, the second USB port 12, and the third USB port 13 is also compatible with USB PD, a negotiation can be performed between the dock station 10 and the external device and power can be supplied according to a result of performing the negotiation.

When an external device is connected to the USB hub 14, an electrical connection via a cable is established. As this cable, a cable for enabling communication to be performed between the dock station 10 and the external device and enabling power to be supplied from the dock station 10 to the external device is used. An example of the cable is a USB Type-A cable.

Here, neither the display device 21 nor the display device 22 has a built-in power supply device.

The display device 21 is connected to the first USB port 11 via a first USB Type-C cable 21a. The display device 21 and the dock station 10 are electrically connected through the first USB Type-C cable 21a. The display device 21 can receive power supplied from the dock station 10 via the first USB Type-C cable 21a.

For example, the display device 21 is connected to the dock station 10 through the USB Type-C cable 21a to communicate with the dock station 10 in accordance with the specifications of DisplayPort over USB Type-C (DP Alt Mode). The transmission of various types of signals, the supply of power, and the supply of video signals output from the computer 30 can be received via the dock station 10. Thereby, it is possible to transmit a DisplayPort signal (a video signal) and perform USB communication with a single USB cable.

Likewise, the display device 22 is connected to the second USB port 12 via a second USB Type-C cable 22a. The display device 22 and the dock station 10 are electrically connected through the second USB Type-C cable 22a. The display device 22 can receive power supplied via the second USB Type-C cable 22a.

For example, the display device 22 is connected to the dock station 10 through the USB Type-C cable 22a to communicate with the dock station 10 in accordance with the specifications of DisplayPort over USB Type-C (DP Alt Mode). The transmission of various types of signals, the supply of power, and the supply of video signals output from the computer 30 can be received via the dock station 10. Thereby, it is possible to transmit a DisplayPort signal (a video signal) and perform USB communication with a single USB cable.

The computer 30 is connected to the third USB port 13 with a third USB Type-C cable 30a. The computer 30 and the dock station 10 are electrically connected through the third USB Type-C cable 30a. The computer 30 can receive power supplied from the dock station 10 via the third USB Type-C cable 30a. A battery is mounted inside the computer 30. The computer 30 can charge the battery with the power supplied from the dock station 10 via the third USB Type-C cable 30a. Also, the computer 30 can be driven by the power supplied from the dock station 10 via the USB Type-C cable 30a. Thereby, it is possible to transmit a DisplayPort signal (a video signal) and perform USB communication with a single USB cable.

Also, the computer 30 outputs the video signal to the dock station 10 via the third USB Type-C cable 30a. For example, the computer 30 is connected to the dock station 10 through the USB Type-C cable 30a to communicate with the dock station 10 in accordance with the specifications of DisplayPort over USB Type-C (DP Alt Mode) and can receive the transmission of various types of signals and the supply of the power.

The video signal output from the computer 30 can be supplied to the display device 21 and the display device 22 via the dock station 10 and can be displayed on each of display screens of the display device 21 and the display device 22.

In the dock station 10, the USB hub 14 has a plurality of connection terminals and connects an external device to any connection terminal via a USB Type-A cable. Examples of external devices connected to the USB hub 14 include the input device 41, the input device 42, and the like.

The input device 41 is, for example, a mouse. The input device 42 is, for example, a keyboard.

In the dock station 10, the power supplier 15 is connected to a commercial power supply 50 and can convert AC power supplied from the commercial power supply 50 into DC power and supply the DC power to each of the external devices connected to the first USB port 11, the second USB port 12, the third USB port 13, and the USB hub 14. A magnitude of power to be supplied to each of the electronic devices connected to the first USB port 11, the second USB port 12, and the third USB port 13 is determined by the negotiation performed by the controller 16. The power supplier 15 supplies power to the external device connected to the USB hub 14 at a predetermined voltage.

The controller 16 performs control for supplying power to the electronic devices (the external devices such as the display device 21, the display device 22, and the computer 30) connected to the USB ports (the first USB port 11, the second USB port 12, and the third USB port 13) via the USB Type-C cables (the first USB Type-C cable 21a, the second USB Type-C cable 22a, and the third USB Type-C cable 30a). The controller 16 performs control for determining a magnitude of the power to be supplied to each of these electronic devices connected to the first USB port 11, the second USB port 12, and the third USB port 13 by negotiating with the electronic devices and supplying the power based on the determination from the power supplier 15.

USB power supply compatible with the USB Type-C terminal is performed under a standard called USB Power Delivery. That is, the external device, which receives the power, notifies the supply side (the dock station 10) of power required for the own external device and the supply side (the dock station 10) supplies the power required for the external device. At this time, the supply side (for example, the controller 16 of the dock station 10) determines whether or not the received power notification exceeds the maximum capacity of the power supply of the supply side (the dock station 10) and does not supply power to the external device when the received power notification exceeds the maximum capacity. The supply side (for example, the controller 16 of the dock station 10) stores in advance a value of the maximum capacity of power capable of being supplied by the supply side in a storage area (for example, a memory device).

The controller 16 controls whether or not to supply power to an external device connected to a connection port in preference to an external device connected to another connection port on the basis of a priority level assigned to each of the plurality of connection ports.

In this way, it is possible to preferentially supply power to an external device connected to a connection port having a high priority level assigned to the connection port regardless of the order of connection even if an external device that is a display device is connected to another connection port after an external device that is not a display device is connected to a connection port by assigning a priority level to the connection port and assigning power to the external device in accordance with the priority level of the connection port to which the external device is connected. Thus, it is possible to solve a situation where no video signal can be displayed on the display device. The connection ports are, for example, the first USB port 11, the second USB port 12, and the third USB port 13.

Also, the controller 16 negotiates with the external device in accordance with a priority order indicated by the priority level. In this way, it is possible to determine whether or not to supply power by performing a negotiation from the external device connected to the connection port having the highest priority level in a process of performing the negotiation in accordance with the priority order indicated by the priority level assigned to the connection port. Thereby, the order in which negotiations can be performed can be determined by the order according to the priority levels assigned to the connection ports. For example, by connecting the display device to the connection port having the higher priority level, power is preferentially supplied to the display device, so that it is possible to reduce the risk that the display device will be not activated.

Also, when the external devices are connected to the connection ports, the controller 16 negotiates with the external device connected to each connection port. Thereby, even if a new external device is subsequently connected to a connection port having a higher priority level than a connection port to which an external device is already connected in a state in which the external device is already connected to the connection port, it is possible to negotiate with the external devices connected to the connection ports again and supply power in accordance with the priority order. For example, even if a display device is subsequently connected to a connection port having a higher priority level in a state in which an external device is already connected to any connection port, it is possible to reduce the risk that the display device will be not activated because power will be able to be supplied to the display device.

The storage 17 stores port identification information and priority levels in association.

Figures 2, 3:
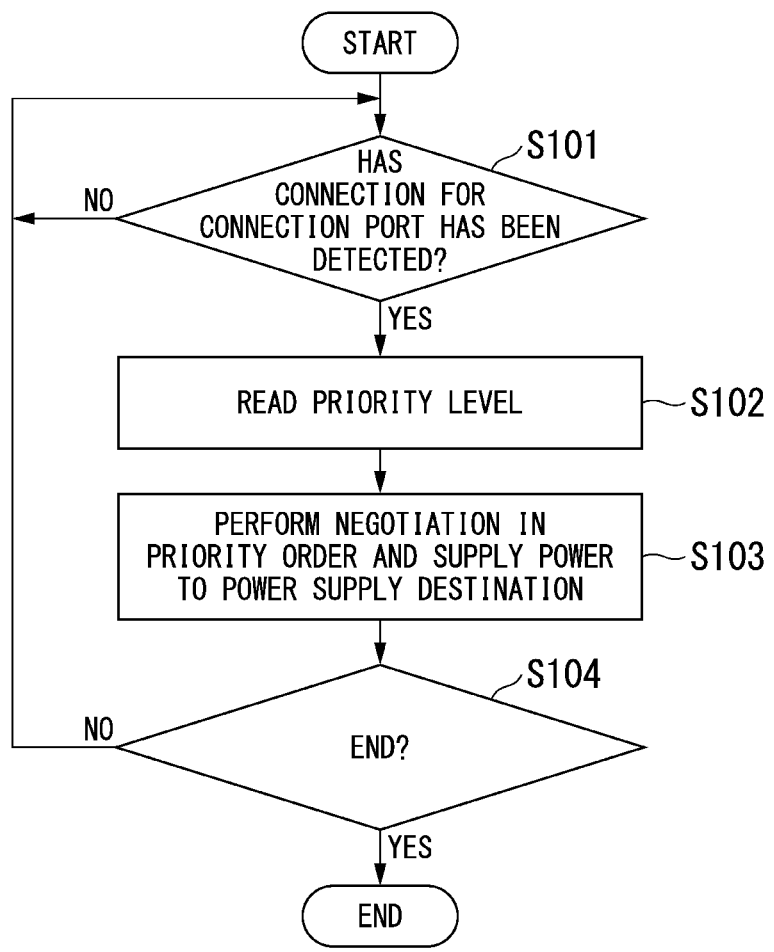
FIG. 2 is a diagram showing an example of information stored in the storage 17.
FIG. 3 is a flowchart for describing an operation of the dock station 10 in the first embodiment.

FIG. 2 is a diagram showing an example of information stored in the storage 17. The port identification information is identification information for identifying each USB port provided in the dock station 10. For the port identification information, for example, a port number can be used. The priority level is a value indicating a priority degree. For example, the priority level indicates that the priority degree is higher when the numerical value is smaller.

The controller 16 reads the priority level assigned to the connection port to which the external device is connected with respect to the connection port from the storage 17 on the basis of the identification information of the connection port and preferentially supplies power to the external device connected to the connection port having the higher priority level that has been obtained.

In this way, the priority level stored in the storage 17 is read and power is supplied to the external device in accordance with this priority level. Thereby, because it is only necessary to store the priority level in the storage 17, a complicated circuit or the like for determining the priority level becomes unnecessary.

Also, in this case, an input for writing the priority level stored in the storage 17 may be provided in the dock station 10. Thereby, when a change in a relationship between the connection port of the dock station 10 and the assigned priority level is desired, the relationship can be easily changed.

FIG. 3 is a flowchart for describing an operation of the dock station 10 in the first embodiment.

The controller 16 of the dock station 10 determines whether or not an external device has been connected to any one of the first USB port 11, the second USB port 12, and the third USB port 13 (step S101).

When it is determined that no external device has been newly connected to a connection port, the controller 16A re-executes the processing of step S101 if a certain waiting time period has elapsed.

When it is determined that an external device has been newly connected to a connection port, the controller 16 reads the priority level assigned to the connection port to which the external device is connected from the storage 17 (step S102).

Here, when the number of connection ports to which electronic devices are connected is two or more, the controller 16 may read the priority level of each connection port from the storage 17. Also, when it is possible to previously read the priority level and store the read priority level in a prescribed storage area of the controller 16 with respect to a connection port to which an external device is already connected, the priority level of a connection port to which an external device is additionally connected may be read.

When the priority level is read, the controller 16 negotiates with the external devices in accordance with the priority order on the basis of the priority level and supplies power to the external devices in accordance with a result of performing the negotiation (step S103). For example, power is supplied if it is possible to negotiate with an external device connected to a connection port having the highest priority level among connection ports to which external devices are connected and supply required power from the external device. The controller 16 negotiates with an external device connected to a connection port having the next highest priority level, determines whether or not power required for the external device can be supplied from the remaining power that can be supplied, determines to supply power to the external device if power can be supplied, and determines not to supply power if power cannot be supplied.

Here, the controller 16 may be configured to perform negotiations in the priority order without negotiating with an external device connected to a connection port having a lower priority level than a connection port for which it is determined that no power will be supplied when there is a connection port for which it is determined that no power will be supplied. From this, if an external device is connected to a connection port with a certain priority level and no power is supplied according to the negotiation and if a lower-power external device is connected to a connection port having a priority level lower than the certain priority level, it is possible to prevent power from being supplied to the lower-power external device. Therefore, even though no power is supplied to the external device connected to the connection port of a certain priority level, it is possible to prevent power from being supplied to the external device having a priority level lower than the certain priority level and supply power in compliance with the priority level.

Also, the controller 16 may be configured to perform negotiations in the priority order and negotiate with an external device connected to a connection port having a lower priority level than a connection port for which it is determined that no power will be supplied even if there is a connection port for which it is determined that no power will be supplied. From this, even if an external device is connected to a connection port with a certain priority level and no power is supplied according to the negotiation, when an external device of lower power is connected to a connection port with a priority level lower than the certain priority level, power can be supplied in a range in which the dock station 10 can supply power. Thus, it is possible to supply power to an external device connected to a connection port with a higher priority level and flexibly supply power to even an external device connected to a connection port having a lower priority level than a connection port to which no power is supplied in an allowable range.

Subsequently, the controller 16A determines whether or not to end the process (step S104), moves the process to step S101 when determining not to end the process, and ends the process when determining to end the process.

According to the first embodiment described above, in the dock station 10, the priority order for the supply of power is predetermined in the order of the first USB port, the second USB port, and the third USB port. The controller 16 negotiates with each USB port in accordance with this priority order. For example, power is supplied in the order of the supply of power to the device connected to the first USB port in the highest priority, the supply of power to the device connected to the second USB port in the second highest priority, and the last supply of power to the device connected to the third USB port. Thereby, the supply of power to a display device is prioritized over the supply of power to the computer 30 connected to the third USB port, so that it is possible to reduce the risk that the display device will not be activated.

According to the display system 1 in the first embodiment, power is supplied to an external device in accordance with the priority level assigned to the USB connection port to which the external device is connected, regardless of the order in which the external device has been connected to the connection port. Thereby, when the user connects an external device with a higher priority level for the supply of power to the dock station 10A, if a connection to the USB connection port to which the higher priority level is assigned is established, it is possible to receive the supply of power even if another external device is already connected to the dock station 10A. Also, when an external device having a lower priority level for the supply of power is connected to the dock station 10A before the electronic device having a higher priority level is connected thereto, it is only necessary to establish a connection to the USB port having a lower priority level. Thus, even if an external device having a higher priority level than an external device that is already connected is connected to the dock station 10 in a state in which an external device having a lower priority level to which power is supplied is connected to the dock station 10, it is possible to supply power to even an external device that is subsequently connected by establishing a connection to a connection port having an assigned priority level higher than a priority level assigned to a connection port to which an external device having a lower priority level is connected.

On the other hand, a general dock station preferentially supplies power in accordance with the order in which external devices have been connected to USB Type-C terminals. Thus, when a computer, a display device A, and a display device B have been connected to the USB Type-C terminals in that order with respect to the general dock station, control for enabling the USB ports in the order of connection is performed. Thus, when a total value of power required for the computer, the display device A, and the display device B exceeds the maximum capacity of the power supply of the dock station, no power is supplied to the display device B for which the connection has been enabled last. That is, a mechanism is configured so that no power is supplied to an external device that exceeds a supply limit. Consequently, when the general dock station is used, there is a problem that the video signal from the computer cannot be displayed on the display screen of the display device B because the display device A operates but the display device B does not operate.

On the other hand, in the present embodiment, because power can be supplied to the external devices (the computer 30, the display device 21, and the display device 22) in accordance with the priority level assigned to the connected connection port instead of the order in which the external devices are connected to the dock station 10, a video signal from the computer 30 can be displayed on the display device 21 and the display device 22.

Next, a display system 1A in the second embodiment will be described.

Figure 4:
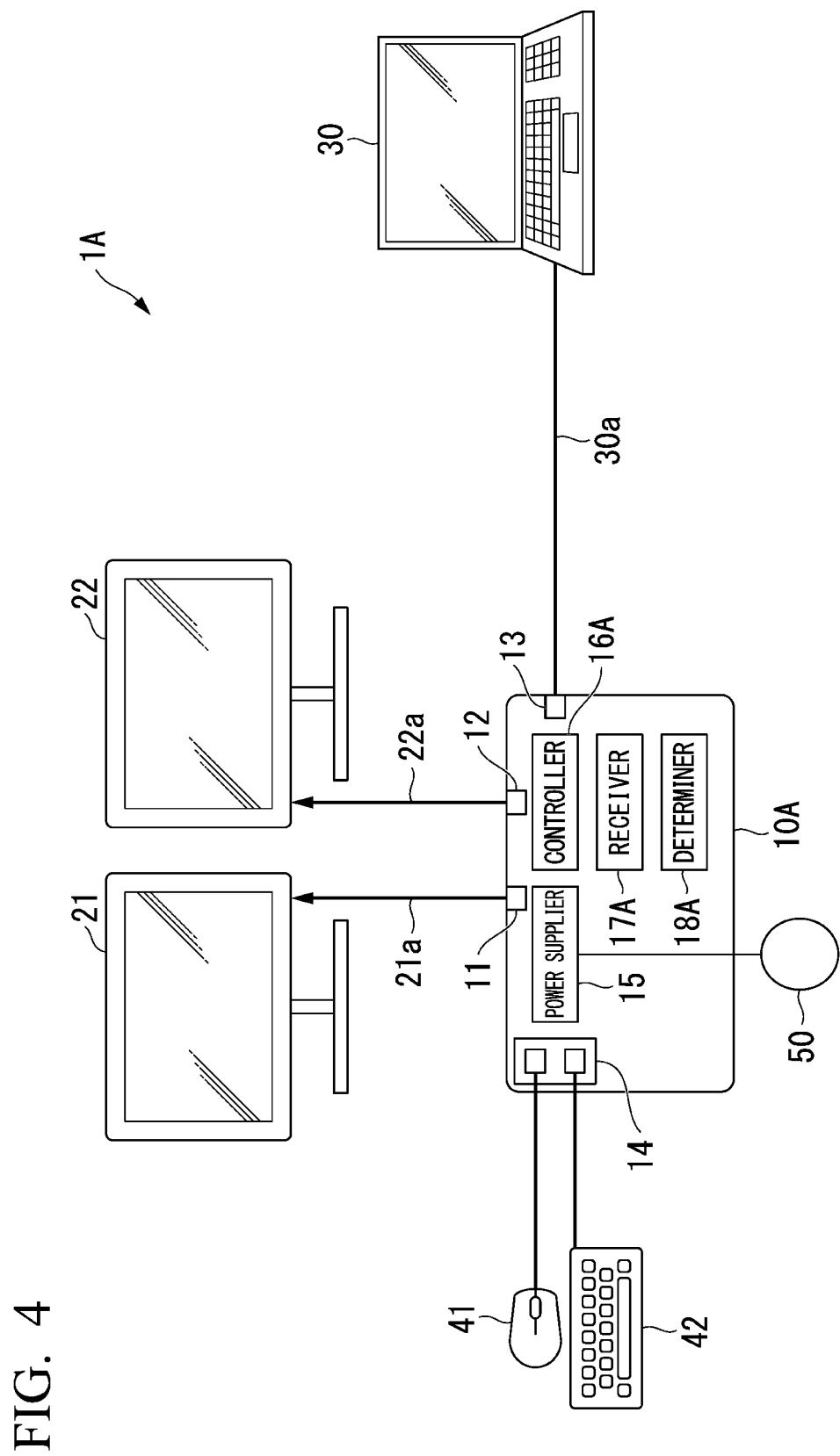
FIG. 4 is a diagram showing a display system 1A using a dock station 10A in a second embodiment.

FIG. 4 is a diagram showing the display system 1A using a dock station 10A in the second embodiment. The display system 1A in the second embodiment and the display system 1 in the first embodiment are different in that the dock station 10A is used instead of the dock station 10 in the second embodiment. This difference will be mainly described, and the same reference signs will be used for common parts, and description thereof will be omitted.

A first USB port 11, a second USB port 12, a third USB port 13, a USB hub 14, a power supplier 15, a controller 16A, a receiver 17A, and a determiner 18A are provided in the dock station 10A.

The receiver 17A receives identification information indicating that an external device connected to a connection port is a display device from the external device. It is only necessary for this identification information to include information for identifying that the electronic device is a display device. For example, the identification information may be information (for example, a flag) indicating the display device. Also, the identification information may be an identification (ID) for identifying the display device. Also, the identification information may be extended display identification data (EDID). When the display device is connected to a PC (a computer) or the like, the EDID is information for notifying the PC or the like of what type of display device is connected by transmitting vendor information, a model number or a serial number, performance information (a corresponding frequency, resolution, color characteristics, and a frequency limit), and the like of a display device from the display device to the PC or the like. When EDID is used as the identification information, it is only necessary to connect a display device having a function of transmitting the EDID to the dock station 10A, so that the display device does not have to have a special function.

The determiner 18A determines whether or not the external device connected to the connection port is a display device on the basis of the identification information.

On the basis of a determination result of the determiner 18A, the controller 16A preferentially supplies power to the external device that is the display device in preference to the external device that is not the display device among the external devices connected to the connection ports.

Figure 5:
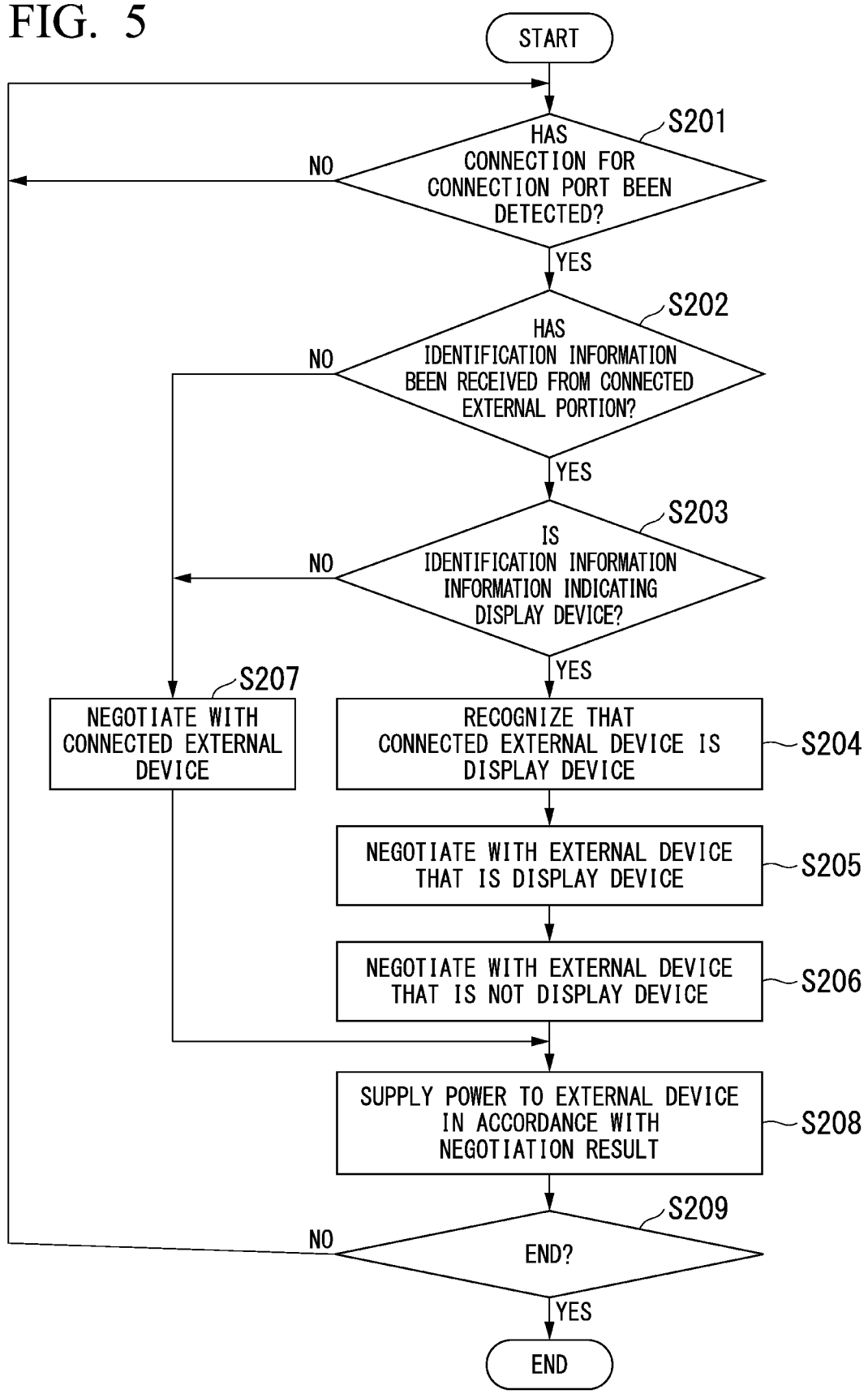
FIG. 5 is a flowchart for describing an operation of the dock station 10A in the second embodiment.

FIG. 5 is a flowchart for describing an operation of the dock station 10A in the second embodiment.

The controller 16A of the dock station 10A determines whether or not an electronic device has been connected to any one of the connection ports of the first USB port 11, the second USB port 12, and the third USB port 13 (step S201).

When the controller 16A determines that no electronic device has been newly connected to the connection port, the controller 16A re-executes the processing of step S201 if a certain waiting time period has elapsed.

On the other hand, when it is determined that the electronic device has been newly connected to the connection port, the controller 16A determines whether or not identification information has been received from the newly connected electronic device (step S202). When it is determined that no identification information has been received from the electronic device, the controller 16A moves the process to step S207 to be described below.

When it is determined that the identification information has been received from the electronic device, the determiner 18A determines whether or not the external device connected to the connection port is the display device on the basis of whether or not the received identification information is the identification information indicating the display device (step S203). When it is determined that the identification information is not the identification information indicating the display device, i.e., when it is determined that the external device is not the display device, the controller 16A moves the process to step S207 to be described below.

On the other hand, when the received identification information is the identification information indicating the display device, i.e., when it is determined that the external device is the display device, the controller 16A recognizes that the display device has been connected to the connected USB port (step S204).

Subsequently, the controller 16A negotiates with the external device that is a display device (step S205). Here, if there is a display device among the already connected external devices in addition to the display device that is the currently connected external device, the negotiations with the already connected display device and the currently connected display device may be performed. Thereby, it is possible to determine a power supply destination after determining whether or not power can be supplied to each display device.

Also, when the negotiations with the already connected display device and the currently connected display device are performed, the negotiations may be performed in accordance with the order of connection. Thereby, even when a large number of display devices are connected to the dock station 10A, the power supply destination can be determined from among the plurality of display devices in accordance with rules.

Subsequently, the controller 16A negotiates with the external device connected to the connection port that is not the display device as a target among the external devices connected to the connection ports (step S206). Thereby, after an assignment process is performed so that power is preferentially supplied to the display device, power can be assigned to an external device that is not the display device within a range of the remaining power that can be supplied. Also, it is possible to assign power to the display device in preference to an electronic device that is not the display device regardless of the order of connection because the negotiation is performed with respect to the external device that is not the display device after the negotiation is performed with respect to the display device when it is determined that a subsequently connected external device is a display device even in a state in which the external device that is not the display device is already connected to the dock station 10A.

Also, when a negotiation with an external device that is not a display device is performed and when a negotiation is performed with respect to each of an external device that is not an already connected display device and an external device that is not a currently connected display device, the negotiation may be performed in accordance with the order of connection. Thereby, even if a large number of external devices that are not display devices are connected to the dock station 10A, it is possible to determine a power supply destination for an external device that is not a display device according to rules.

On the other hand, if NO is determined in step S202 or if NO is determined in step S203, the controller 16A negotiates with an external device that is not a currently connected display device (step S207). Thereby, the controller 16A can determine whether or not to supply power to the external device within the range of the remaining power that can be supplied, except for power that is already supplied to the external device. For example, even if the display device is already connected to the dock station 10A, the supply of power to the display device can be maintained.

The controller 16A supplies power to the external device according to a result of performing the negotiation (step S208).

The controller 16A determines whether or not to end the process (step S209), moves the process to step S201 when determining not to end the process, and ends the process when determining to end the process.

According to the second embodiment described above, the controller 16A communicates with devices connected to the first USB port, the second USB port, and the third USB port. At this time, the power supply side and the power reception side perform negotiations in the order of connection and determine a voltage/current to be supplied. Specifically, the dock station 10A (the supply side) notifies the external device (the power reception side) of voltage/current combinations capable of being supplied and the external device can receive power supplied by designating any combination among the voltage/current combinations. Here, when the device connected to the USB port is a display device, a signal, an ID, or the like indicating the display device is transmitted from the display device to the dock station 10A. The controller 16A is configured to perform the supply of power to the USB port to which the display device is connected in preference to the USB port to which the external device that is not the display device is connected.

More specifically, the controller 16A receives a signal, an ID, or the like indicating a display device and then negotiates with the power supply side and the power reception side with respect to a USB port to which a display device is connected in preference to a USB port to which an external device that is not a display device is connected. Thereby, the supply of power to the display device is prioritized, so that it is possible to reduce the risk that the display device will not be activated.

The dock station 10 in the first embodiment and the dock station 10A in the second embodiment described above can also be used in an office with a free address (also called a hot desk). For example, users often use mobile devices centered on notebook computers. In such a case, by establishing a connection to a dock (for example, the dock station 10 or the dock station 10A) using a USB Type-C cable, it is possible to implement a video from a desktop display, the supply of power to the computer, the exchange of a USB hub function using a single USB Type-C cable. In this case, a mobile device such as a computer can be used without worrying about charging. For example, because a mobile device such as a computer can be charged by connecting it to the dock via a USB Type-C cable, it is also possible to perform charging without connecting another cable such as a power adapter.

Also, even if an editing task or the like is difficult in a small screen provided in a mobile device, it is possible to display a screen of a computer on a display device by connecting the computer and the display device to a dock station in an office and perform a task in a large screen in the office.

In this case, by installing the dock station 10 or the dock station 10A on the desk with a free address, it is possible to freely select and connect a desktop display with a desired size from desktop displays having screen sizes such as 20- to 40-inch classes in the office.

Also, in the office, two desktop displays are often connected. Further, some desktop displays do not have a power supply board and receive power supplied from the dock via USB Type-C.

When such a desktop display is connected to the dock station 10 or the dock station 10A, power is preferentially supplied to each desktop display and then the surplus power is supplied to another external device. For example, it is assumed that power capable of being supplied by the dock station 10 or the dock station 10A is 100 W, the power required for the two desktop displays is 20 W, and the power required for the notebook computer is 60 W. In such a case, when these external devices are connected, even if the power is preferentially supplied to the display device, the power can be supplied within a range in which power can be supplied by the dock station 10 or the dock station 10A. Therefore, it is possible to supply power to these two display devices, the computer, and the like.

Also, for example, it is assumed that power capable of being supplied by the dock station 10 or the dock station 10A is 100 W, the power required for the two desktop displays is 20 W, and the power required for the notebook computer is 85 W. In such a case, when two display devices are connected after the computer is connected to the dock station 10 or the dock station 10A, because power to be supplied exceeds the range of power capable of being supplied if power is supplied to the computer after power is supplied to the two display devices, the supply of power to the computer is stopped and power is supplied to the two display devices. At this time, the computer can be driven by a battery provided therein.

Next, a third embodiment will be described.

Figure 6:
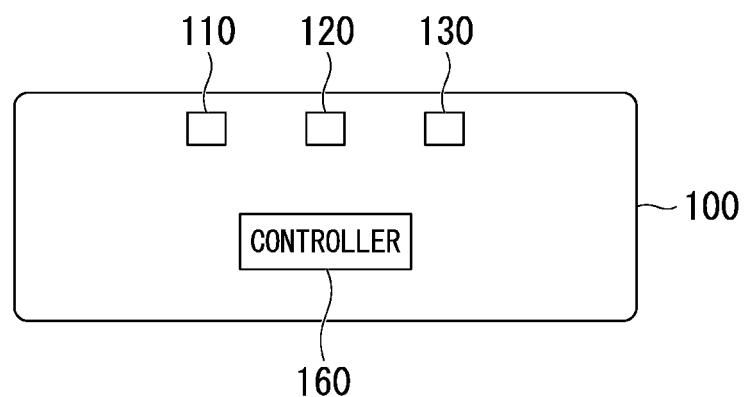
FIG. 6 is a functional block diagram showing a schematic configuration of an electronic device in a third embodiment.

FIG. 6 is a functional block diagram showing a schematic configuration of an electronic device in the third embodiment.

A plurality of connection ports 110, 120, and 130 to which external devices can be connected are provided in an electronic device 100. Also, a controller 160 for controlling whether or not to supply power to an external device connected to a connection port in preference to an external device connected to another connection port on the basis of a priority level assigned to each of the plurality of connection ports is provided in the electronic device 100.

Next, a fourth embodiment will be described.

Figure 7:
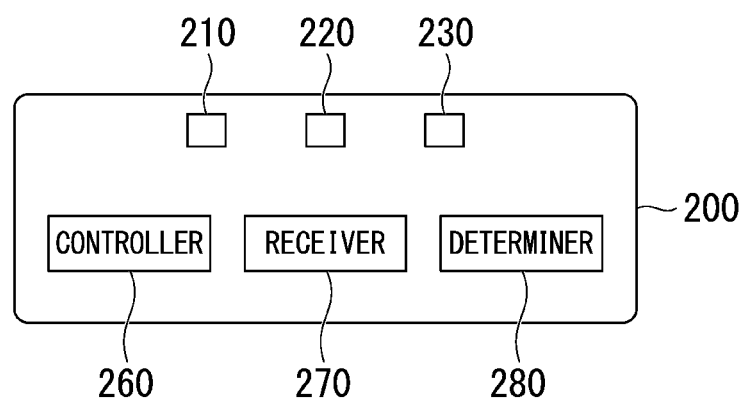
FIG. 7 is a functional block diagram showing a schematic configuration of an electronic device in a fourth embodiment.

FIG. 7 is a functional block diagram showing a schematic configuration of an electronic device in the fourth embodiment.

In an electronic device 200, each of a connection port 210, a connection port 220, and a connection port 230 can be connected to an external device.

A receiver 270 receives identification information indicating that the external device is a display device from the external device connected to the connection port.

A determiner 280 determines whether or not the external device connected to the connection port is a display device on the basis of the identification information.

On the basis of a determination result, a controller 260 supplies power to the external device that is the display device in preference to the external device that is not the display device among the external devices connected to the connection ports.

Also, construction management is performed by recording a program for implementing the functions of the parts in FIGS. 1, 4, 6, and 7 on a computer-readable recording medium and causing a computer system to read and execute the program recorded on the recording medium. Also, the "computer system" used here may include an operating system (OS) and hardware such as peripheral devices.

Also, the "computer system" is assumed to include a homepage providing environment (or displaying environment) when a World Wide Web (WWW) system is used.

Also, the "computer-readable recording medium" refers to a storage device such as a flexible disc, a magneto-optical disc, a read-only memory (ROM), a portable medium such as a compact disc-ROM (CD-ROM), and a hard disk embedded in the computer system. Further, the "computer-readable recording medium" is assumed to include a medium that retains a program for a given period of time such as a volatile memory inside the computer system serving as a server or a client. Also, the above-described program may be a program for implementing some of the above-described functions. Further, the above-described program may be a program capable of implementing the above-described function in combination with a program already recorded on the computer system. Also, the above program may be stored in a prescribed server and the program may be distributed (downloaded or the like) via a communication circuit in response to a request from another device.

Although embodiments of the present invention have been described above with reference to the drawings, specific configurations are not limited to the embodiments and other designs and the like may also be included without departing from the scope of the present invention.

REFERENCE SIGNS LIST

1 Display system
1A Display system
10 Dock station

10A Dock station
11 First USB port
12 Second USB port
13 Third USB port
14 USB hub
15 Power supplier
16 Controller
16A Controller
17 Storage
17A Receiver
18A Determiner
21 Display device
21a Type-C cable
22 Display device
22a Type-C cable
30 Computer
30a Type-C cable
41 Input device
42 Input device
100 Electronic device
110 Connection port
120 Connection port
130 Connection port
160 Controller
200 Electronic device
210 Connection port
220 Connection port
230 Connection port
260 Controller
270 Receiver
280 Determiner

The invention claimed is:

1. An electronic device comprising:
a plurality of connection ports to which external devices are able to be connected; and
a controller configured to control whether or not to supply power to a first external device connected to a first connection port in preference to a second external device connected to a second connection port on the basis of a priority level assigned to each of the plurality of connection ports,
wherein the controller is configured to perform negotiations in a priority order indicated by the priority level without negoitating with a third external device connected to a third on connection port having a lower priority level than a fourth connection port for which it is determined that no power will be supplied.

2. The electronic device according to claim 1,
wherein, when the external devices are connected to the plurality of connection ports, the controller negotiates with the external devices connected to each of the plurality of connection ports.

3. The electronic device according to claim 1, the electronic device comprising:
a storage configured to store port identification information and priority levels in association,
wherein the controller reads the priority level assigned to a fifth connection port to which the fourth external device is connected with respect to the fifth connection port from the storage on the basis of the identification information of the fifth connection port and determines whether or not to supply power to the fourth external device on the basis of the read priority level.

4. The electronic device according to claim 1,
wherein at least one of the plurality of connection ports is electrically connected to at least one of the external devices through a cable.

5. The electronic device according to claim 1,
wherein at least one of the connection ports is connected to at least one of the external devices in accordance with a USB Type-C standard.

6. An electronic device comprising:
a plurality of connection ports to which external devices are able to be connected;
a receiver configured to receive identification information indicating that the external device is a display device from the external devices connected to the connection ports;
a determiner configured to determine whether or not the external device connected to the connection port is a display device on the basis of the identification information; and
a controller configured to supply power to an external device that is a display device among the external devices connected to the connection ports in preference to an external device that is not a display device on the basis of a determination result.

7. The electronic device according to claim 5,
wherein the controller negotiates with the external device that is not the display device after negotiating with the external device that is the display device.

8. The electronic device according to claim 5,
wherein the controller negotiates with the external device that is not the display device among the external devices that are already connected after negotiating with each external device that is the display device among the external devices already connected to the display devices when the connected external device is the display device on the basis of a determination result.

9. The electronic device according to claim 5,
wherein, when a negotiation with the external device that is not the display device is performed, the controller determines whether or not to supply power to the external device that is not the display device on the basis of the remaining power capable of being supplied other than power that is already supplied to the external device.

10. A power supply method for an electric device, the power supply method comprising:
controlling whether or not to supply power to a first external device connected to a first connection port in preference to a second external device connected to a second connection port on the basis of a priority level assigned to each of a plurality of connection ports to which external devices are able to be connected; and
performing negotiations in a priority order indicated by the priority level without negotiating with a third external device connected to a third connection port having a lower priority level than a fourth connection port for which it is determined that no rower will be supplied.

11. A power supply method for an electronic device, the power supply method comprising:
receiving, by a receiver, identification information indicating that an external device is a display device from external devices connected to a plurality of connection ports to which the external devices are able to be connected;
determining, by a determiner, whether or not the external device connected to the connection port is a display device on the basis of the identification information; and supplying, by a controller, power to an external device that is a display device among the external devices connected to the connection ports in preference to an external device that is not a display device on the basis of a determination result.

* * * * *